United States Patent [19]
Battocchio

[11] Patent Number: 6,092,770
[45] Date of Patent: Jul. 25, 2000

[54] STAND FOR PHOTOGRAPHIC-OPTICAL AND CINEMATOGRAPHIC EQUIPMENT

[75] Inventor: Gilberto Battocchio, Bassano del Grappa, Italy

[73] Assignee: Lino Manfrotto & Co., S.p.A., Bassano del Grappa, Italy

[21] Appl. No.: 09/158,105

[22] Filed: Sep. 22, 1998

[30] Foreign Application Priority Data

Oct. 9, 1997 [IT] Italy .............................. PD97A000223

[51] Int. Cl.$^7$ ................................................. F16M 11/38
[52] U.S. Cl. ........................ 248/171; 248/166; 248/170; 248/188; 248/188.6; 248/188.7
[58] Field of Search .................... 248/171, 170, 248/166, 188, 188.6, 188.7

[56] References Cited

U.S. PATENT DOCUMENTS

| | | | |
|---|---|---|---|
| 1,443,432 | 1/1923 | Peacock | 248/166 |
| 2,282,285 | 5/1942 | Olson | 248/168 |
| 2,303,978 | 12/1942 | Biberman | 248/171 |
| 2,359,821 | 10/1944 | Black | 248/171 |
| 2,374,021 | 4/1945 | Korling | 248/171 |
| 2,588,399 | 3/1952 | McQuin | 248/170 |
| 2,973,933 | 3/1961 | Howell | 248/166 |
| 3,168,134 | 2/1965 | Guske | 248/171 |
| 3,190,597 | 6/1965 | Bieschke | 248/171 |
| 3,417,952 | 12/1968 | Bieschke | 248/171 |
| 3,804,355 | 4/1974 | Uroshevich | 248/170 |
| 4,309,010 | 1/1982 | Posso | 248/166 |
| 4,323,477 | 4/1982 | Miyazaki | 248/171 |
| 4,502,654 | 3/1985 | Albee . | |
| 4,988,064 | 1/1991 | Hoshino | 248/170 |
| 5,062,606 | 11/1991 | Hoshino | 248/171 |
| 5,421,549 | 6/1995 | Richards | 248/171 |
| 5,794,899 | 8/1998 | Tamllos | 248/166 |

FOREIGN PATENT DOCUMENTS

| | | | |
|---|---|---|---|
| 545994 | 9/1957 | Canada | 248/171 |
| 9098749 | 5/1946 | France . | |
| 1773637 | 10/1977 | Germany | 248/171 |
| 3604497 | 8/1987 | Germany . | |

Primary Examiner—Anita M. King
Assistant Examiner—Debbie Short
Attorney, Agent, or Firm—Sughrue, Mion, Zinn, Macpeak & Seas, PLLC

[57] ABSTRACT

A stand for photographic/optical and cinematographic equipment comprises a central column and a tripod base for the column including three legs and respective arms for connecting the legs to the column. The base comprises a first and a second articulation element slidable on and fixed to the column, respectively, with the legs articulated to the first articulation element about articulation axes substantially perpendicular to radii of the column. The connecting arms have their opposite ends articulated, respectively, to an intermediate portion of the corresponding leg and to the second articulation element, and each leg is movable from an inoperative position in which it is brought, with the corresponding connecting arm, close to the column, to an operative position in which it is opened out away from the column. The legs and the connecting arms have articulation points on the first and second articulation elements, respectively, the articulation points having an arrangement such that, in the inoperative position with each leg brought close to the central column, the axes of the legs and of the corresponding connecting arms are approximately coplanar with the axis of the central column so that the space occupied by each leg with the corresponding arm is predominantly included within the projection of the space occupied by the column.

10 Claims, 5 Drawing Sheets

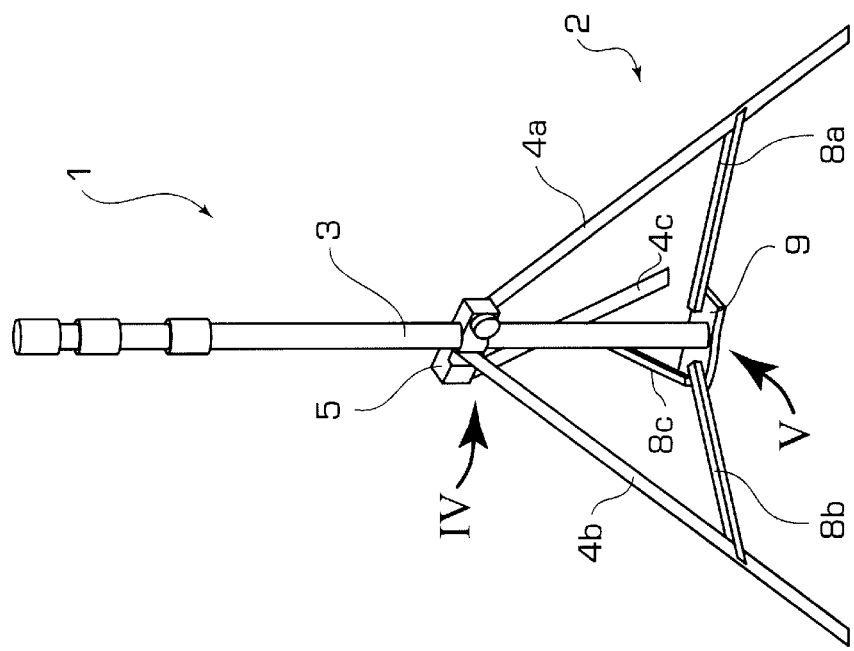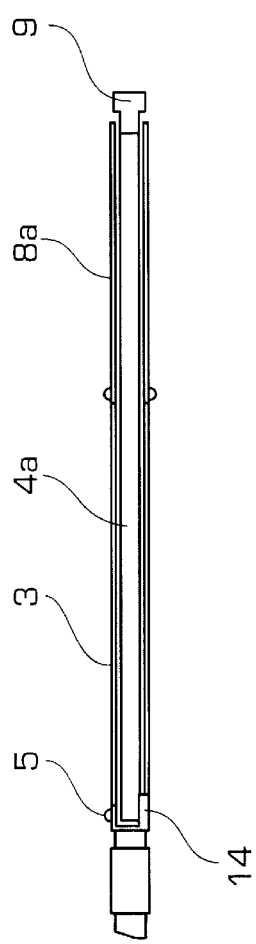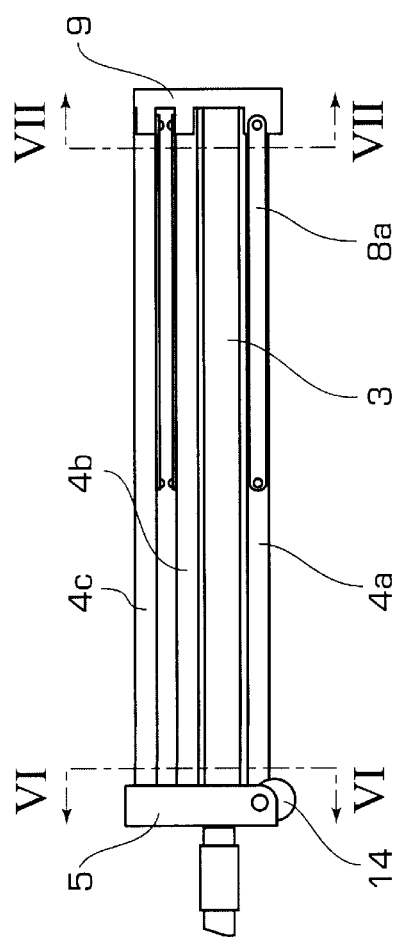

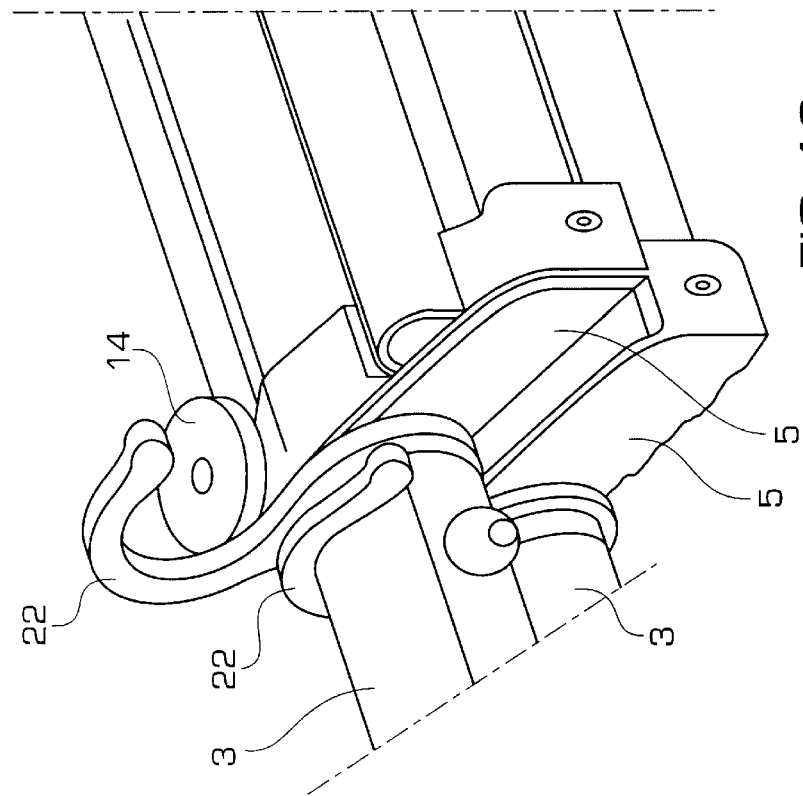
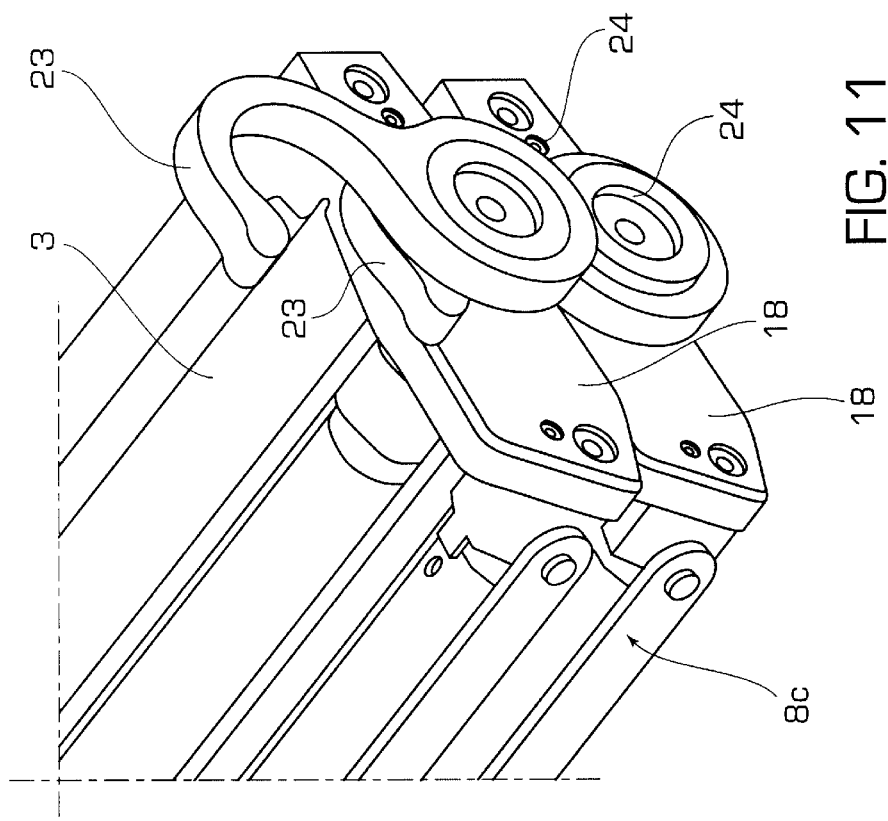

STAND FOR PHOTOGRAPHIC-OPTICAL AND CINEMATOGRAPHIC EQUIPMENT

BACKGROUND OF THE INVENTION

The present invention relates to a stand for photographic/optical and cinematographic equipment, according to the preamble to the main claim.

Stands of the aforesaid type are used widely in the photographic and cinematographic fields. An example of a solution offered by the prior art is constituted by stands in which the first and the second articulation elements are generally star-shaped with three lobes to which the legs and the corresponding arms connecting the legs to the central column are articulated, respectively. The presence of the connecting arms and the need for the column to be centered relative to the points at which the legs bear on the ground requires both articulation elements to have lobes arranged at 120° to one another and the articulation axes of the legs and of the arms to be arranged perpendicular to radii of the axis of the central column. When these stands are intended for users who use them to a considerable extent, for example, hirers of cinematographic equipment for supporting screens, reflectors, lamps and other accessories, there is a need to store the stands in the most compact storage configurations. They are normally kept stacked parallel on top of one another but the bulkiness of the three-lobed articulation elements transverse the central column does not allow best use to be made of the storage space.

Stands with so-called free legs, which have no arms for connecting the legs to the central column are also known. With these stands it is possible, when the stand is closed, to achieve less bulky configurations than with stands having the connecting arms described above. For example, stands with legs which are supported by brackets mounted for pivoting on the central column, and which can be pivoted and aligned in a substantially flattened configuration when the stand is closed, are known. However, this configuration can be achieved precisely because of the lack of connecting arms, allowing the legs to be pivoted freely relative to the column. The absence of a connection between the leg and the central column, however, limits the use of stands with free legs purely to the support of relatively small loads such as those of small photographic devices and equipment; these stands are not, however, intended for supporting loads of a certain size such as those of the more bulky cinematographic equipment mentioned above. In these cases, it is essential to use stands with legs having intermediate connecting arms which act as ties for limiting the bending of the legs and the related stresses and, as a result, the above-mentioned problems are encountered with their storage.

SUMMARY OF THE INVENTION

The problem upon which the present invention is based is that of providing a stand of the aforementioned type which has arms for connecting the legs to the central column, but which is designed structurally and functionally to prevent the problems complained of with reference to the prior art mentioned.

This problem is solved by the invention by means of a stand formed in accordance with the following claims.

BRIEF DESCRIPTION OF THE DRAWINGS

The characteristics and advantages of the invention will become clearer from the following detailed description of a preferred but not exclusive embodiment thereof, described by way of non-limiting example with reference to the appended drawings, in which:

FIG. 1 is a perspective view of a stand formed in accordance with the invention, FIGS. 2 and 3 are a partial side elevational view and a partial front view, respectively, of the stand of FIG. 1 in a closed configuration, FIGS. 11 and 12 are partial perspective views of two further details of the stand of the invention.

DETAILED DESCRIPTION OF THE INVENTION

Figure 4:
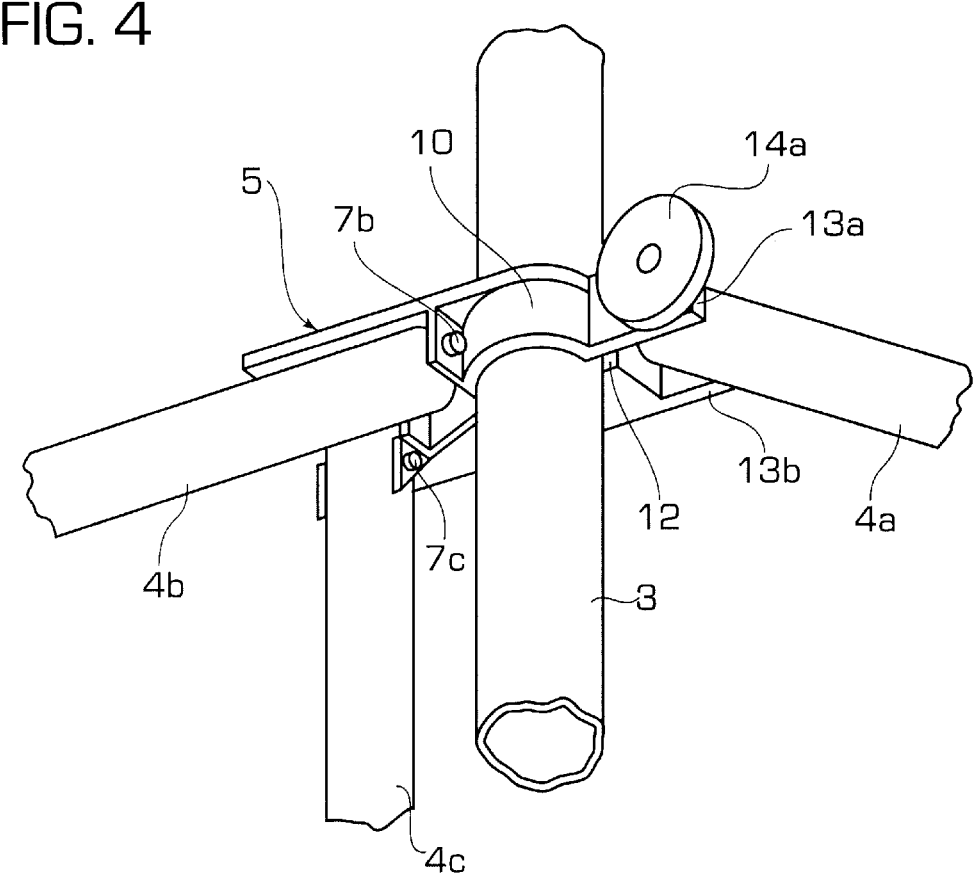
FIGS. 4 and 5 are perspective views of two details of the stand of the invention, indicated by the arrows VI and V of FIG. 1, respectively, FIGS. 6 and 7 sections taken on the lines VI—VI and VII—VII of FIG. 2, respectively, on an enlarged scale.
Figure 5:
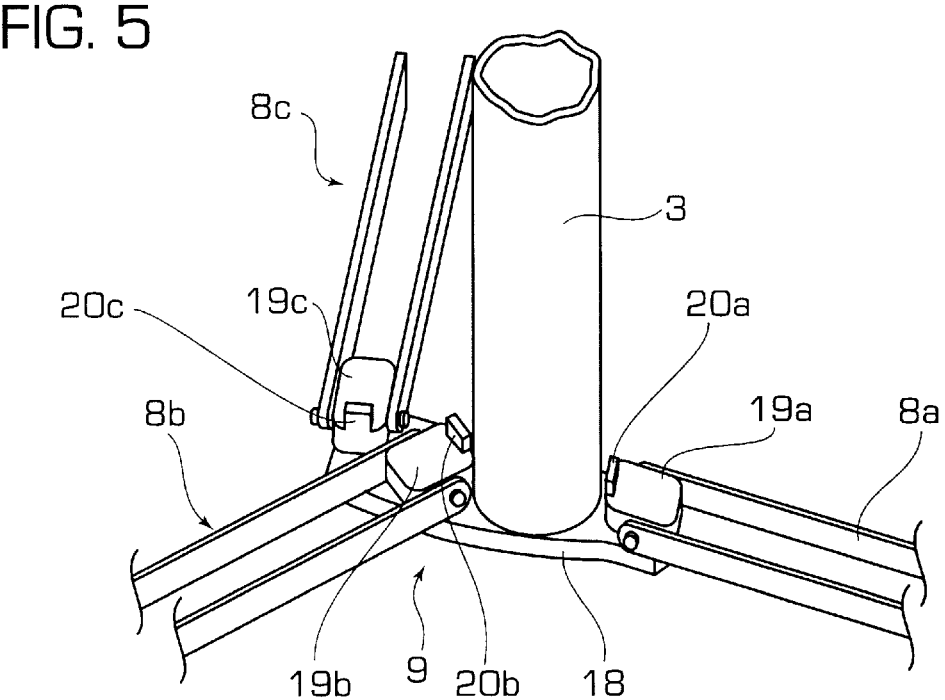

With reference to FIGS. 1 to 3, a stand for supporting photographic/optical and cinematographic equipment, formed in accordance with the present invention, is generally indicated 1. The stand 1 comprises a tripod base generally indicated 2, for supporting a central column 3 having an axis X, including two or more telescopically associated portions.

The tripod base 2 comprises three leg 4a, 4b, 4c, each articulated at one of its ends to a first articulation element 5 which can be fixed in an adjustable position along the column 3. The legs 4a, 4b, 4c are articulated about respective articulation axes 6a, 6b, 6c by means of corresponding pins 7a, 7b, 7c.

Each leg 4a, 4b, 4c is also connected to the column 3 by means of a respective connecting arm 8a, 8b, 8c having opposite ends articulated, respectively, to an intermediate portion of the corresponding leg and to a second articulation element 9 mounted on the lower end of the column 3.

The first articulation element 5 comprises a collar-like portion 10 having a through-hole 11 by means of which it is fitted on the column 3. The collar-like portion 10 is interrupted circumferentially by a slot 12 by means of which the collar can be resiliently deformed radially and, in particular, contracted radially. In the region of the slot 12, the collar-like portion has two appendages 13a, 13b which project outwardly and are disposed on opposite sides of the slot 12, and between which the end of the leg 4a is articulated by means of the pin 7a. The articulation element 5 is clamped on the column 3 by means of a screw clamping device with an operating knob 14. The knob 14 is screwed onto a threaded portion of the pin 7a on the outer side of the appendage 13a. It should be noted that the screw of the clamping device also acts as the articulation pin of the leg 4a. It should also be noted that the knob 14 remains substantially included within the overall space occupied by the articulation element 5, particularly in a direction perpendicular to the articulation axis 6a.

Two seats 15, 16 formed in the element 5 on the opposite side of the column 3 to the point of articulation of the leg 4a are defined by respective pairs of opposed shoulders 15a, 15b and 16a, 16b between which the ends of the legs 4b and 4c are articulated, by means of pins 7b, 7c, about the respective articulation axes 6b, 6c.

The second articulation element 9 comprises a plate-shaped body 18 fixed to the lower end of the column 3 and carrying three blocks 19a, 19b, 19c for the articulation of respective connecting arms 8a, 8b, 8c. Each arm in turn comprises a pair of arm elements having opposite ends articulated to diametrally opposed sides of the corresponding block, and to an intermediate portion of the respective leg.

Three appendages, indicated 20a, 20b, 20c, project from respective blocks 19a, 19b, 19c and constitute abutments for the free ends of the legs 4a, 4b, 4c so as to limit unidirectionally the opening out of the legs and to prevent the legs from opening out in the opposite direction to the opening direction.

Figure 6:
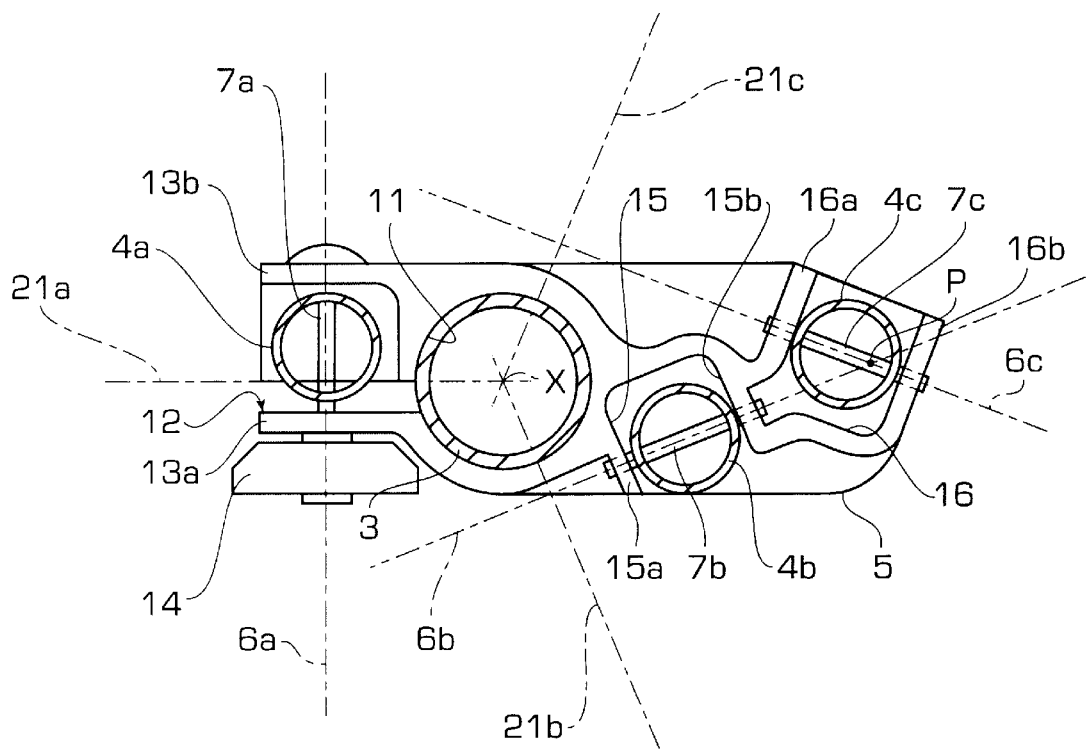

With reference to FIG. 6, the articulation points of the legs 4b, 4c constituted by the respective pins 7b, 7c lie on the same side of a diametral plane of the column 3 parallel to the axis of articulation 6a of the leg 4a. Again in FIG. 6, the radii of the column 3 which are perpendicular to the respective articulation axes 6a, 6b, 6c are indicated 21a, 21b, 21b. These radii 21a, 21b, 21c are spaced substantially equiangularly. It should be noted that the articulation points of the legs 4b, 4c lying on the same side of the column 3, are shifted to the same side relative to the respective radii 21b, 21b. In particular, the articulation point of the leg 4c is disposed substantially on the opposite side of the articulation point of the leg 4b to the column so that the articulation axes 6b, 6c intersect at a point P lying on the pin 7c.

Figure 7:
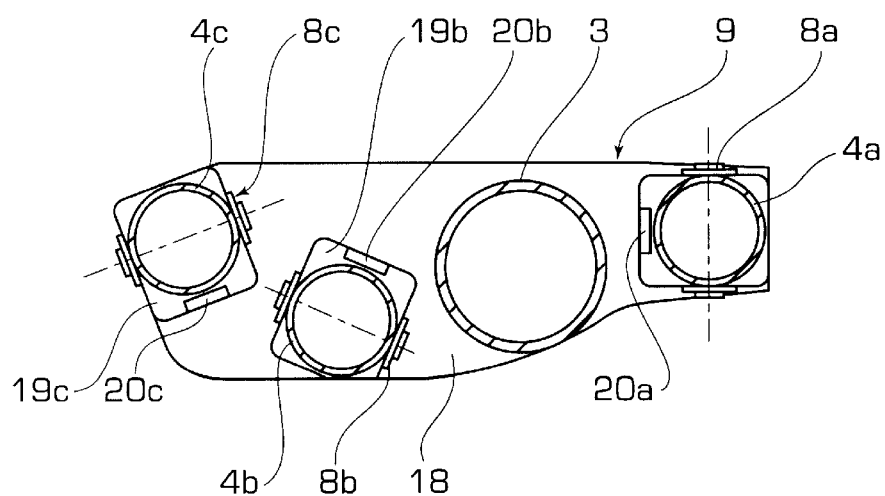

With reference to FIG. 7, the articulation points of the arms 8a, 8b, 8c for connection to the second articulation element 9 have a configuration substantially corresponding to that described above for the legs 4a, 4b, 4c.

Figure 8:
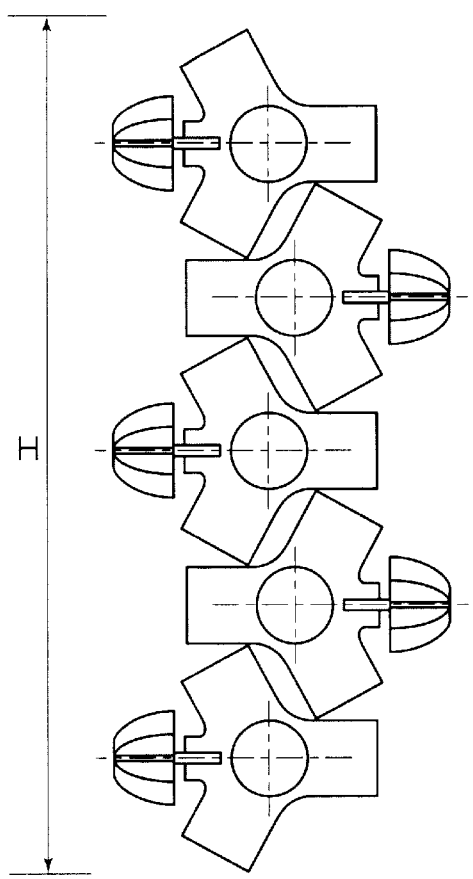
FIGS. 8 and 9 are schematic views of the stacking configurations achieved with stands according to the prior art and accord to the invention, respectively.
Figure 9:
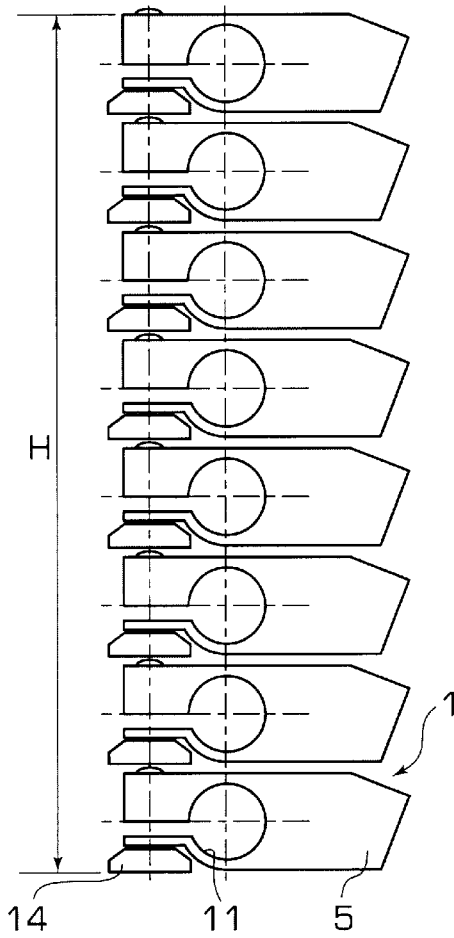

The arrangement of the articulation points of the legs 4a, 4b, 4c and of the arms 8a, 8b, 8c on the respective articulation elements is such that, when the stand 1 is in the closed position of FIG. 2, the axes of the legs 4a, 4b, 4c and of the arms 8a, 8b, 8c are approximately coplanar with the axis X of the column 3 or their deviation from a coplanar condition is at most such that the space occupied by each leg and by the corresponding connecting arm is predominantly included within the space occupied by the column 3, projected along an axis contained in the aforementioned plane. In the inoperative, closed position of the stand, the legs 4a, 4b, 4c and the column 3 thus adopt a substantially "flattened" configuration as shown in FIGS. 2 and 3. This configuration advantageously enables stands to be stacked parallel to one another, taking up less space than stands of conventional design. FIGS. 8 and 9 show schematically the stacks of a certain height H which can be formed with stands according to the prior art and with stands of the same size formed in accordance with the invention. For a given space occupied, the stands according to the invention advantageously permit approximately 35% better stacking than the solution offered by the prior art.

Figure 10:
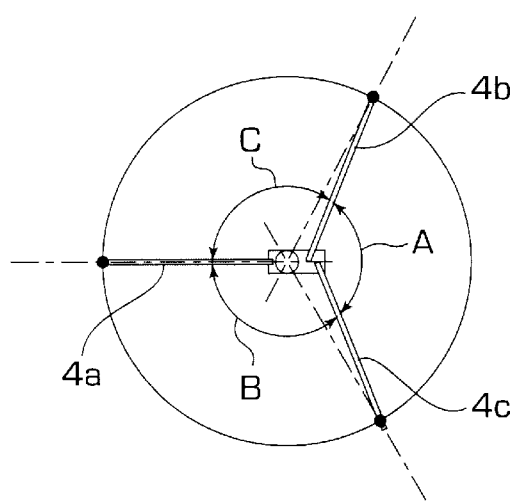
FIG. 10 is a schematic plan view of the stand of the invention.

With reference to FIG. 10, the angle formed between the legs 4b, 4c articulated on the same side of the column 3 is indicated A. The value selected for the angle A is larger than that of the respective angles B and C formed between the legs 4b, 4c and the third leg 4a and, in particular, the value selected is such that a spacing of 120° is maintained between the points of contact of the legs 4a, 4b, 4c with the ground. This configuration enables the column 3 to be positioned as centrally as possible relative to the points of contact with the ground and consequently permits a balanced distribution of the loads bearing on the stand.

The stand 1 is further provided with first and second hooked elements 22, 23 which can engage corresponding portions of the column 3 of a second stand adjacent the first and disposed parallel thereto in the stacked configuration of FIG. 9. The first hooked element 22 is mounted adjacent the first articulation element 5 and the second hooked element 23 is fixed to a pin 24 projecting from the second articulation element 9 on the opposite side to the blocks 19a, 19b, 19c. Pairs of stands stacked in the configuration of FIG. 9 are connected to one another by means of the hooked elements 22, 23 so that stands of the same stack are connected to one another in a pack and their handling is thus facilitated. The use of a belt or handle, not shown in the drawings, for mounting on the first stand of the pack when required, is envisaged for transporting the pack of stands thus obtained.

The invention thus solves the problem set, achieving the advantages mentioned above in comparison with known solutions.

What is claimed is:

1. A stand for photographic/optical and cinematographic equipment, comprising a central column and a tripod base for the column including three legs and respective arms for connecting the legs to the column, the base comprising a first and a second articulation element slidable on and fixed to the column, respectively, the legs being articulated to the first articulation element about articulation axes substantially perpendicular to radii of the column, the connecting arms having their opposite ends articulated, respectively, to an intermediate portion of the corresponding leg and to the second articulation element, each leg being movable from an inoperative position in which it is brought, with the corresponding connecting arm, close to the column, to an operative position in which it is opened out away from the column at an inclination limited by the corresponding connecting arm, characterized in that the legs and the connecting arms have articulation points on the first and second articulation elements, respectively, the articulation points having an arrangement such that, in the inoperative position with each leg brought close to the central column, the axes of the legs and of the corresponding connecting arms are approximately coplanar with the axis of the central column so that the space occupied by each leg with the corresponding arm is predominantly included within the space occupied by the column, projected along an axis contained in the plane.

2. A stand according to claim 1, in which the articulation points of two of the legs lie on the same side of a diametral plane of the column parallel to the articulation axis of the third leg, characterized in that the articulation points of the legs lying on the same side are shifted to the same side of the corresponding radii of the column perpendicular to the respective articulation axes.

3. A stand according to claim 2, in which the legs are articulated to the first articulation element about the articulation axes by means of respective pins, the articulation axes of the legs situated on the same side intersecting at a point lying on one of the respective articulation pins.

4. A stand according to claim 3, in which, when the stand is in the operative position, respective angles are formed between the legs of the base, the angle formed between the legs articulated on the same side of the column being larger than each of the angles formed by the said legs with the third leg articulated on the opposite side.

5. A stand according to claim 1, comprising a screw clamping device for fixing the first articulation element in an adjustable position along the column, the screw constituting the articulation pin of one of the legs of the base.

6. A stand according to claim 5, in which the clamping device comprises a knob for operating the screw, the knob being included within the overall space occupied by the first articulation element.

7. A stand according to claim 1, comprising abutment means on the second articulation element for unidirectionally limiting the opening out. of the legs of the base.

8. A stand according to claim 7, in which the abutment means comprise appendages formed on the second articulation element, constituting abutments for the free ends of the legs.

9. A stand according to claim 1, comprising engagement means for mutually connecting one stand and another stand when the stands are stacked on top of one another in a configuration in which legs and columns of the stands are arranged parallel to one another.

10. A stand according to claim 9, in which the engagement means comprise a pair of hooked elements mounted on the stand adjacent the first and second articulation elements respectively, the hooked elements being able to engage corresponding portions of another stacked stand.

* * * * *